March 7, 1939.  C. M. ANDERSON  2,149,718
BRAKE CONTROLLING LEVER MECHANISM
Filed March 25, 1938  2 Sheets-Sheet 1

Inventor
C. M. Anderson

March 7, 1939.  C. M. ANDERSON  2,149,718
BRAKE CONTROLLING LEVER MECHANISM
Filed March 25, 1938   2 Sheets-Sheet 2

C. M. Anderson  Inventor

Jesse R. Stone
&
Lester B. Clark

By

Attorneys

Patented Mar. 7, 1939

2,149,718

UNITED STATES PATENT OFFICE 2,149,718

BRAKE CONTROLLING LEVER MECHANISM

Carl M. Anderson, Corsicana, Tex., assignor to American Well & Prospecting Company, a corporation Application March 25, 1938, Serial No. 198,019

9 Claims. (Cl. 188—77)

My invention relates to brake levers such as are employed in tightening the brake band upon a brake drum. Levers of this kind may be employed generally in the application of brake bands to drums but it is intended more particularly for application to hoisting drums such as are employed in reeling up cable in hoisting operations.

It is an object of the invention to provide a lever or system of levers whereby the brake band may be easily and positively applied to the drum when desired.

It is a further object of the invention to provide a lever whereby the force applied to the brake band in applying the brake to the drum will increase gradually as the brake is tightened.

It is a further object of the invention to provide a mechanism for tightening the brake band which may be assembled in compact form so as to take up but little room beside the brake drum.

The invention resides largely in the particular form and arrangement of the parts making up the invention and reference is had to the drawings herewith wherein the structure is clearly shown.

In Fig. 1 I have shown a side view of the levers employed in tightening the brake, the brake lever being moved to brake setting position.

Figures 3, 4:
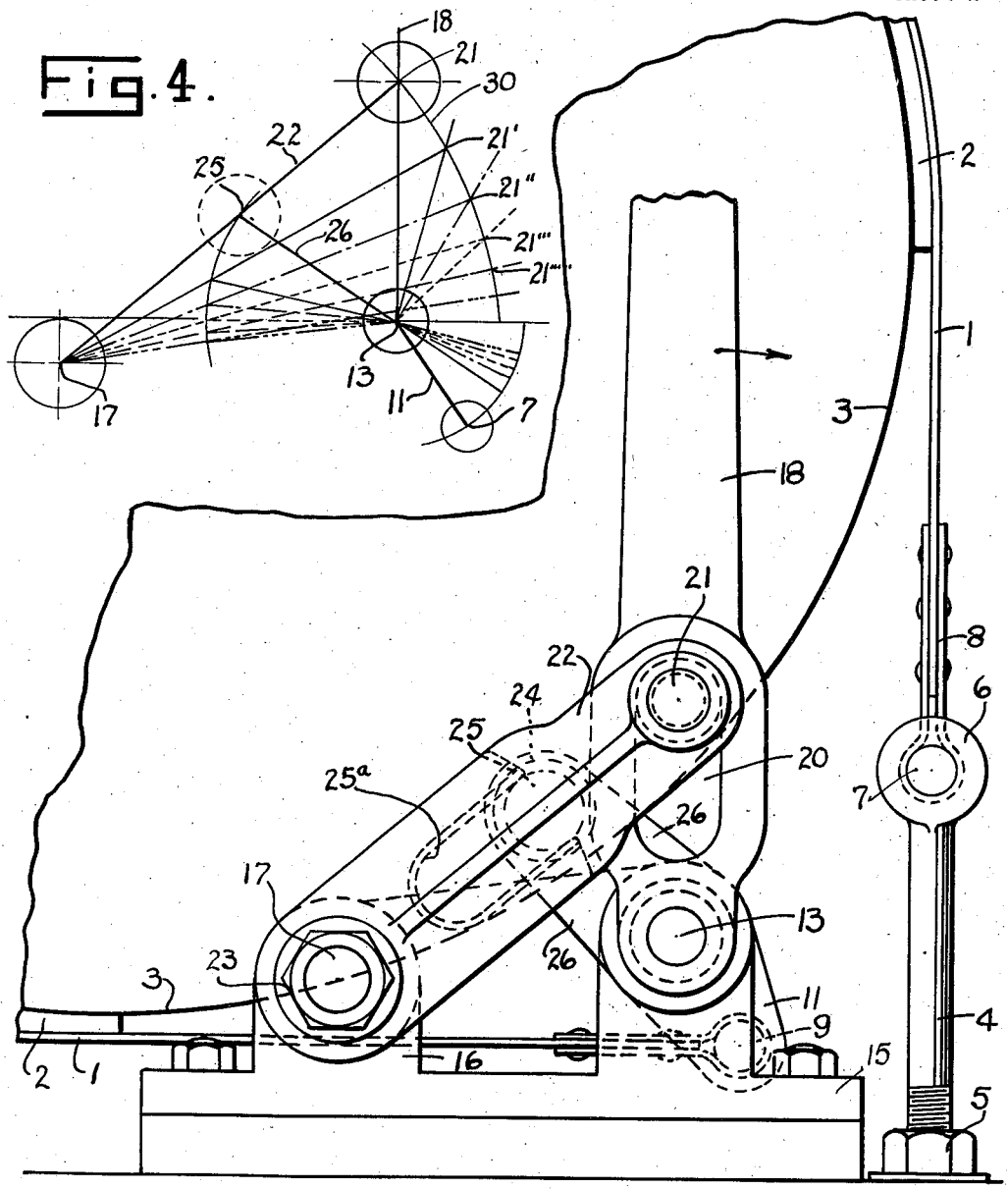
Fig. 3 is a side view similar to Fig. 1 showing the brake lever mounted beside the brake drum and with the brake band in released position.
Fig. 4 is a diagrammatic view showing the position of the parts in the operating of the brake to and from brake applying position.

I have shown with particular reference to Fig. 3 a brake band 1 having a lining 2 therein and bearing against the outer periphery of a brake drum 3. One end of the brake band 1 is secured in stationary position relative to the platform or support upon which the brake is mounted. I provide an anchor bolt 4 secured adjustably at 5 within the base. The upper end of the anchor post is forked to provide two end supports 6, shown particularly in Fig. 2, to receive a cross pin 7 about which a hinge plate 8 on the brake band is secured. This end of the brake band is usually termed the dead end.

The opposite end of the brake band is extended forwardly beneath the drum to a point spaced somewhat from the anchor bolt 4 and is there secured to a cross pin 9 which is supported at its ends in brake arms 11 extending downwardly at an angle from a sleeve 12 mounted upon a brake shaft 13. The shaft 13 is mounted within a post 14 extending upwardly from a base plate 15. Said base plate is extended rearwardly from the shaft 13 and has a rearward post 16 within which a stub shaft 17 is supported. The outer end of the shaft 13 is reduced somewhat in diameter and serves as a support for a hand lever 18.

The lever 18 is shown as broken off but it is to be understood as extending upwardly a sufficient distance to be easily grasped by the operator when the brakes are to be set. The lower end of the lever is pivoted upon the shaft 13 and its movement therefore has no effect directly upon said shaft.

Adjacent the lower end of the lever is an elongated slot or opening 20 within which a pin or stud 21 is slidable. There is a roller on the pin 21, which fits within the slot or opening 20 and may move therein from one end to the other of said slot. The pin or shaft 21 is mounted in the upper end of a cam lever 22 which is pivoted at its lower end upon the stub shaft 17 previously noted. A nut 23 upon the shaft 17 tends to hold the cam lever 22 rotatably upon the stub shaft 17.

Between the ends of the lever arm 22 and on the inner face thereof is an elongated recess forming a cam slot within which a roller 24 upon a pin 25 may roll. The recess is of sufficient length to allow the necessary movement therein of the roller 25 as will be noted.

The roller 24 and the pin 25 upon which it is mounted are secured in the end of a shaft operating lever 26 projecting rearwardly and upwardly from the shaft 13. The lever 26 has at its lower end a sleeve or bushing 27 supported upon the shaft 13 to which it is secured nonrotatably by means of the key, indicated at 28 in Fig. 2. Thus, as the shaft operating lever 26 is moved through its connection with the lever arm 22 the shaft 13 will be given a partial rotation.

Figure 2:
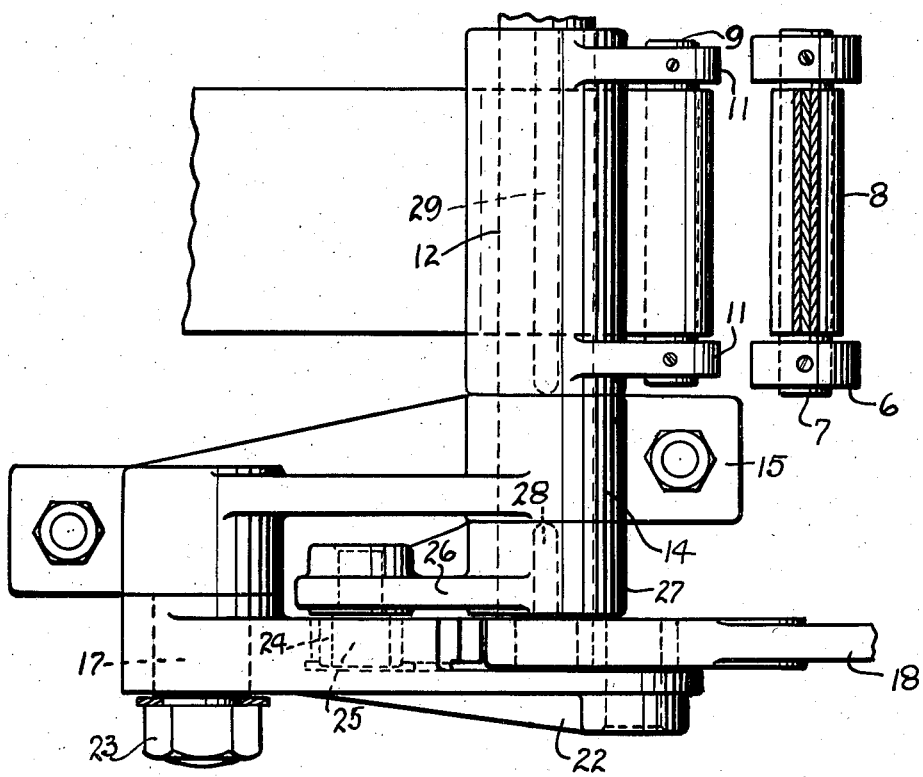
Fig. 2 is a broken top plan view of the system of levers shown in Fig. 1.

The brake arms 11 to which the attaching pin 9 is secured is also keyed to the shaft 13, as indicated in dotted lines at 29 in Fig. 2.

Figure 1:
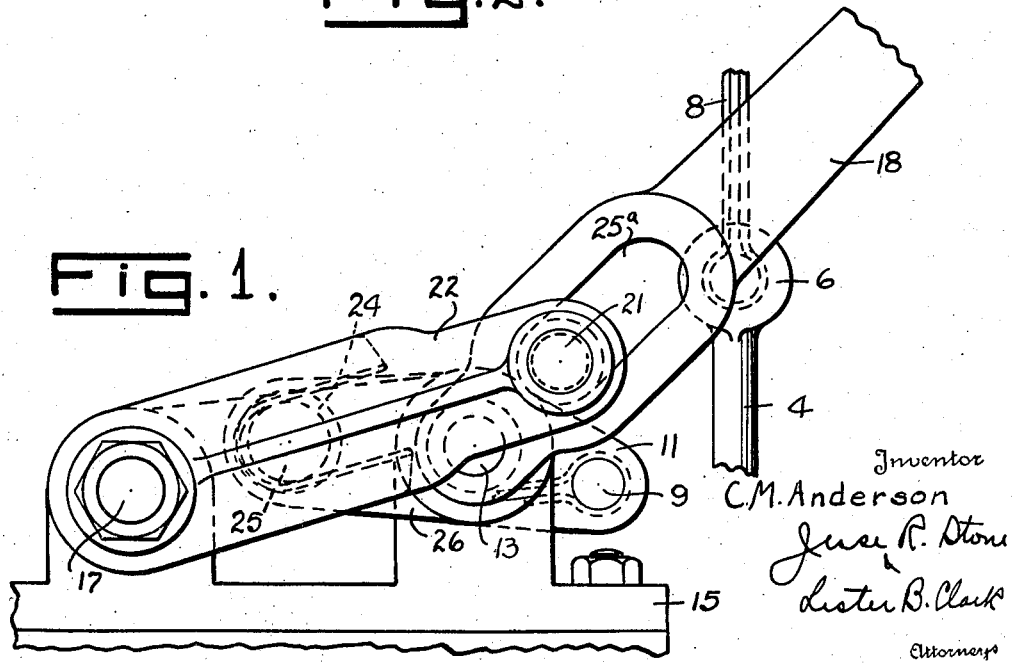

It will now be seen that as the brake lever 18 is swung to the right of its position shown in Fig. 3 a force will be exerted against the roller on the pin 21 and thus operate the lever 22 tending to move it in an arc forwardly and that, as the lever arm 18 is gradually moved to its position in Fig. 1, the lever arm 18 will be lengthened relative to the weight arm and the force applied to the cam lever arm 22 will increase due to this increasing mechanical advantage. Also, as the lever arm 22 is moved from one position, as shown in Fig. 3, to its position shown in Fig. 1, the action will be to move the roller 24 on the arm 26 downwardly in the recess in the arm 22, as indicated at 25a in Figs. 1 and 3. The shaft 13 will thus be rotated in a counter-clockwise direction. As the movement of the arm 22 progresses the length of the power arms 21—25 will also be increased, as will be obvious.

The movement of the lever 26 will rotate the shaft 13 and thus exert a pull upon the arms 11 and set the brake. It will be seen that the force exerted to set the brake is an increasing one due to the mechanical advantage in the resultant increase in effective length of arm 25—13 relative to that of arm 13—9.

Fig. 4 has been developed to show the manner in which the leverage on each one of the levers included in the system necessary to exert the final pull upon the brake band increases in force with the movement of the lever arm.

With reference to this lever, the swinging of the lever arm in the arc indicated at 30 will gradually increase the leverage exerted upon the cam lever 22, for the distance between the position of 21 and the point 13, as shown at 21′, 21″ and 21‴, etc. gradually shortens and the distance on the lever arm 18 from the point 21 to 21‴ inclusive, to the outer end is proportionally lengthened, thus giving a leverage advantage as the lever 18 is swung downwardly to exert a force upon the cam lever 22.

On the other hand, the movement of the lever 22 will exert an increasing force to swing the arm 26 due to the fact that the end of the arm 26 at 25 gradualy moves nearer to the fulcrum 17 of the lever 22. This same mechanical advantage is obtained between the levers 26 and the arms 11, for as the point 25 on the lever 26 moves downwardly its leverage relative to the fulcrum 13 increases while the length of the lever arm 11 gradualy decreases relative to the application of the power thereto.

It is therefore obvious that my application of power to the brake band to set the brake will function to exert a force to set the brake band which constantly increases as the brake band is tightened upon the drum. This is of material advantage. The operator can with the ordinary hand brake exert all the power which is necessary to stop the drum from rotation even under heavy loads. The device is easy to operate and is mechanically safe and reliable. The further advantages will be obvious to those skilled in the art.

What is claimed is:

1. A brake drum, a brake band thereon, one end of which is fixed, a brake shaft, a brake arm fixed thereon at one end and secured to the free end of said brake band at the other end, an operating lever fixed on said shaft, a stub shaft, a cam lever pivoted thereon, a cam slot in said cam lever, a roller on said operating lever movable in said slot, a hand lever pivoted to said brake shaft, a slidable connection between said hand lever and one end of said cam lever, whereby the movement of said hand lever will actuate said cam lever and said operating lever to rotate said brake shaft, in the manner described.

2. A brake drum, a brake band thereon, one end of which is fixed, a brake shaft, a brake arm fixed thereon at one end and secured to the free end of said brake band at the other end, an operating lever fixed on said shaft, a stub shaft parallel with said brake shaft, a cam lever pivoted thereon and projecting above said brake shaft, a cam slot in said cam lever, a roller on said operating lever movable in said slot, a hand lever pivoted to said brake shaft, a slidable connection between said hand lever and one end of said cam lever, whereby the movement of said hand lever will actuate said cam lever and said operating lever to rotate said brake shaft, in the manner described.

3. A brake band, a brake shaft, a brake arm fixed on said shaft and connected to one end of said brake band, an operating lever fixed on said shaft and projecting in the opposite direction from said brake arm, a hand lever pivoted upon said brake shaft, a cam slot therein, a cam lever pivoted adjacent said brake shaft and engaging at one end in said cam slot, and a slidable connection between said cam lever and said operating lever, whereby an increasing mechanical advantage is obtained on said operating lever as said hand lever is moved to pull the brake band.

4. A leverage system for brakes and the like including a brake shaft, brake arms fixed thereon and extending forwardly therefrom for attachment to a brake band, a shaft operating lever fixed on said shaft and projecting in a direction substantially opposite to said brake arms, a stub shaft spaced rearwardly from said brake shaft, a cam lever pivoted upon said stub shaft at one end, a hand lever pivoted upon said brake shaft, cam slots in said hand lever and said cam lever, a roller on the forward end of said cam lever engaging in the cam slot in said hand lever, and a roller on the outer end of said shaft operating lever engaging in the cam slot in said cam lever, whereby the power arm upon each of said levers increases in length as said hand lever is swung to set the brakes.

5. A leverage system for brakes and the like including a brake shaft, brake arms fixed thereon and extending forwardly therefrom for attachment to a brake band, a shaft operating lever fixed on said shaft and projecting in a direction substantially opposite to said brake arms, a stub shaft spaced rearwardly from said brake shaft, a cam lever pivoted upon said stub shaft at one end, a hand lever pivotally supported adjacent said brake arms and extending normally upwardly, a cam slot spaced slightly above the lower end thereof, a cam slot in said cam lever intermediate its ends, a roller on the forward end of said cam lever engaging in the cam slot in said hand lever, and a roller on the outer end of said shaft operating lever engaging in the cam slot in said cam lever, whereby the power arm upon each of said levers increases in length as said hand lever is swung to set the brakes.

6. A leverage system for brakes and the like including a brake shaft, brake arms fixed thereon and extending forwardly therefrom for attachment to a brake band, a shaft operating lever fixed on said shaft and projecting in a direction substantially opposite to said brake arms, a stub shaft spaced rearwardly from said brake shaft, a cam lever pivoted upon said stub shaft at one end, a hand lever pivoted upon said brake shaft, cam slots in said hand lever and said cam lever, a slidable engagement of the upper end of said cam lever in the cam slot of said hand lever, a similar engagement of the end of said shaft operating lever in the cam slot in said cam lever, whereby the power arm upon each of said levers increases in length as said hand lever is swung to set the brakes.

7. A lever mechanism for brakes and the like, including a brake shaft, a brake band engaging arm thereon extending forwardly and downwardly therefrom, a brake operating lever extending from said shaft in a substantially opposite direction, said arm and lever being fixed relative to each other to move simultaneously, a hand lever pivotally mounted on said brake shaft, a cam lever pivoted at one end behind said brake shaft, and slidable operative connections between said cam lever and said hand lever at the forward end of said cam lever and between said brake operating lever intermediate the ends of said cam lever, said connections being movable to lengthen the power arm and shorten the weight arm as said hand lever is moved to brake setting position.

8. A lever mechanism for brakes and the like, including a brake shaft, a brake band engaging arm thereon extending forwardly and downwardly therefrom, a brake operating lever extending from said shaft in a substantially opposite direction, said arm and lever being fixed relative to each other to move simultaneously, a cam lever pivoted to the rear of said shaft, a cam slot in said cam lever, a sliding engagement of said shaft operating lever in said slot, and a hand lever pivoted at its lower end and engaging the end of said cam lever to exert a pull thereon, as the lever is moved to brake setting position.

9. A leverage system for brakes and the like including a brake shaft, a brake band engaging arm and a shaft operating lever fixed on said shaft and extending in substantially opposed directions therefrom, a stub shaft to the rear of said brake shaft, a cam lever pivoted to said stub shaft and extending forwardly, a hand operated lever pivoted at its lower end and having a slidable operative engagement with the forward end of the said cam lever, a cam slot in said cam lever, and means on said shaft operating lever engaging slidably in said slot whereby the power arm of each lever approaches its maximum as said hand lever is operated in a brake setting direction.

CARL M. ANDERSON.